(12) United States Patent
Kubo et al.

(10) Patent No.: US 6,885,482 B1
(45) Date of Patent: Apr. 26, 2005

(54) IMAGE PROCESSING METHOD AND IMAGE PROCESSING APPARATUS

(75) Inventors: Noboru Kubo, Ikoma (JP); Xiaomang Zhang, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 983 days.

(21) Appl. No.: 09/630,661

(22) Filed: Aug. 1, 2000

(30) Foreign Application Priority Data

Aug. 27, 1999 (JP) .......................................... 11-242305

(51) Int. Cl.⁷ .............................................. G03F 3/08
(52) U.S. Cl. ...................... 358/518; 358/537; 358/532; 382/162; 382/156; 382/254; 382/274
(58) Field of Search ................. 358/518, 537, 358/532, 500, 504, 509, 512, 520, 521, 527; 382/162, 156, 254, 274, 260, 168

(56) References Cited

U.S. PATENT DOCUMENTS

| | | | | |
|---|---|---|---|---|
| 4,648,051 A | * | 3/1987 | Wandell et al. | 382/162 |
| 4,685,071 A | * | 8/1987 | Lee | 382/162 |
| 4,884,221 A | * | 11/1989 | Sugiyama et al. | 382/165 |
| 4,992,963 A | * | 2/1991 | Funt et al. | 382/162 |
| 5,200,832 A | * | 4/1993 | Taniuchi et al. | 358/300 |
| 5,640,469 A | * | 6/1997 | Lewins et al. | 382/274 |
| 5,717,839 A | * | 2/1998 | Ichikawa | 358/1.9 |
| 5,907,629 A | * | 5/1999 | Funt et al. | 382/162 |
| 5,991,456 A | * | 11/1999 | Rahman et al. | 382/254 |
| 6,038,339 A | * | 3/2000 | Hubel et al. | 382/162 |
| 6,212,304 B1 | * | 4/2001 | Durg et al. | 382/254 |
| 6,249,601 B1 | * | 6/2001 | Kim et al. | 382/162 |
| 6,304,294 B1 | * | 10/2001 | Tao et al. | 348/370 |
| 6,343,147 B1 | * | 1/2002 | Yamamoto | 382/167 |
| 6,538,696 B1 | * | 3/2003 | Hieda et al. | 348/317 |
| 6,563,602 B1 | * | 5/2003 | Uratani et al. | 358/1.9 |
| 6,631,216 B1 | * | 10/2003 | Hieda et al. | 382/300 |
| 2003/0152283 A1 | * | 8/2003 | Moriwaki | 382/274 |

FOREIGN PATENT DOCUMENTS

| | | | |
|---|---|---|---|
| JP | 9-233480 | 9/1997 | |
| JP | 10-11571 | 1/1998 | |
| WO | WO 97/45809 | * 12/1997 | G06T/5/20 |

OTHER PUBLICATIONS

Daniel J. Jobson et al., "A Multiscale retinex for Bridging the Gap Between Color Images and the Human Observation of Scenes", Jul. 7, 1997, IEEE Transactions On Image Processing, vol. 6, No. 7, pp. 965–976.*

Daniel J. Jobson et al. , "Properties and Performance of a Center/Surround Retinex", Mar. 3, 1997, IEEE Transactions on Image Processing, vol. 6, No. 3, pp. 451–462.*

Daniel J. Jobson et al. , "Multi–Scale Retinex For Color Image Enhnacement", 1996, IEEE, pp. 1003–1006.*

Daniel J. Jobson et al , "Properties and Performance of a Center/Surround Retinex," IEEE Transactions on Image Processing, vol. 6, pp. 451–462, (Mar. 1997).

Daniel J. Jobson et al, "A Multiscale Retinex for Bridging the Gap Between Color Image and the Human Observation of Scenes," IEEE Transactions on Image Processing, vol. 6, pp. 956–976, (Jul. 1997).

* cited by examiner

*Primary Examiner*—Kimberly Williams
*Assistant Examiner*—Tia A. Carter
(74) *Attorney, Agent, or Firm*—Birch, Stewart, Kolasch & Birch, LLP

(57) ABSTRACT

An image processing method includes the steps of: separating a luminance signal from a color signal of an original image, and multiscale retinex processing only the luminance signal; and producing an image based on the multiscale retinex processed luminance signal and the color signal of the original image.

12 Claims, 5 Drawing Sheets

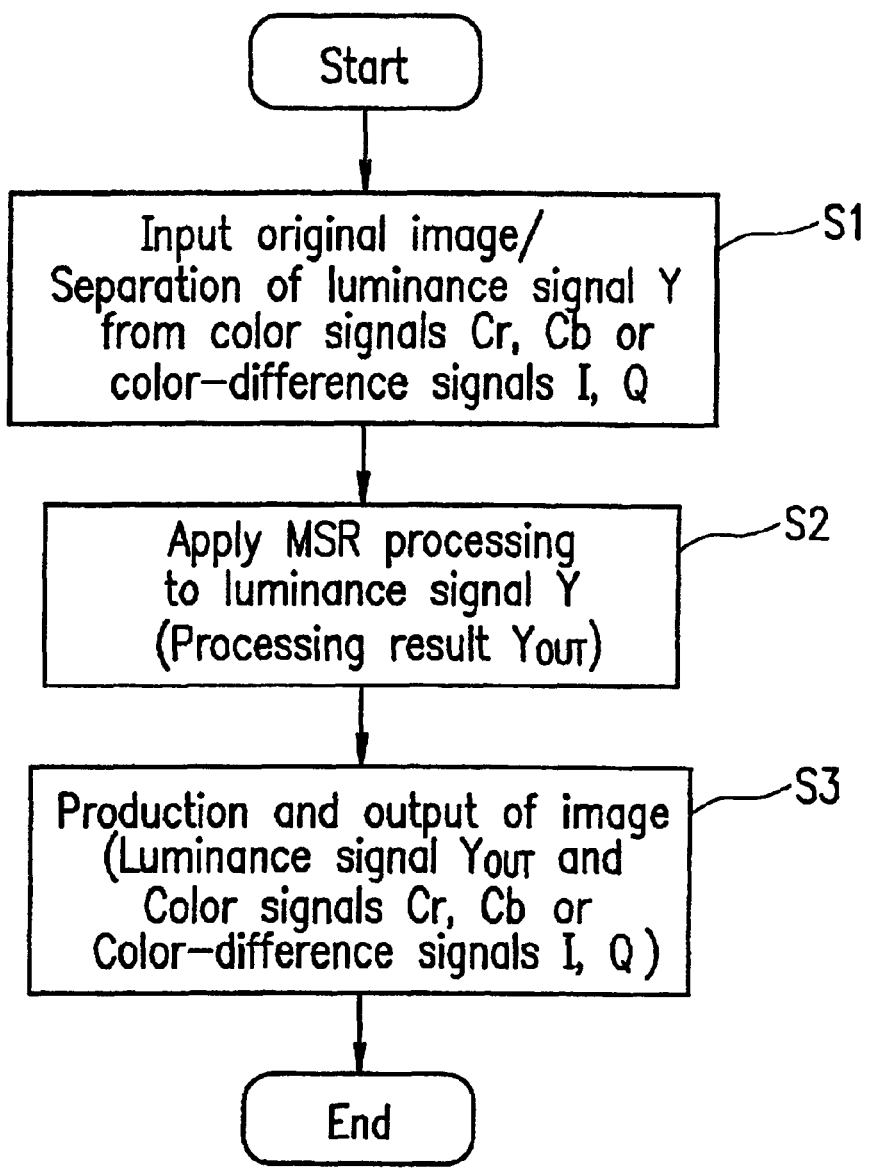

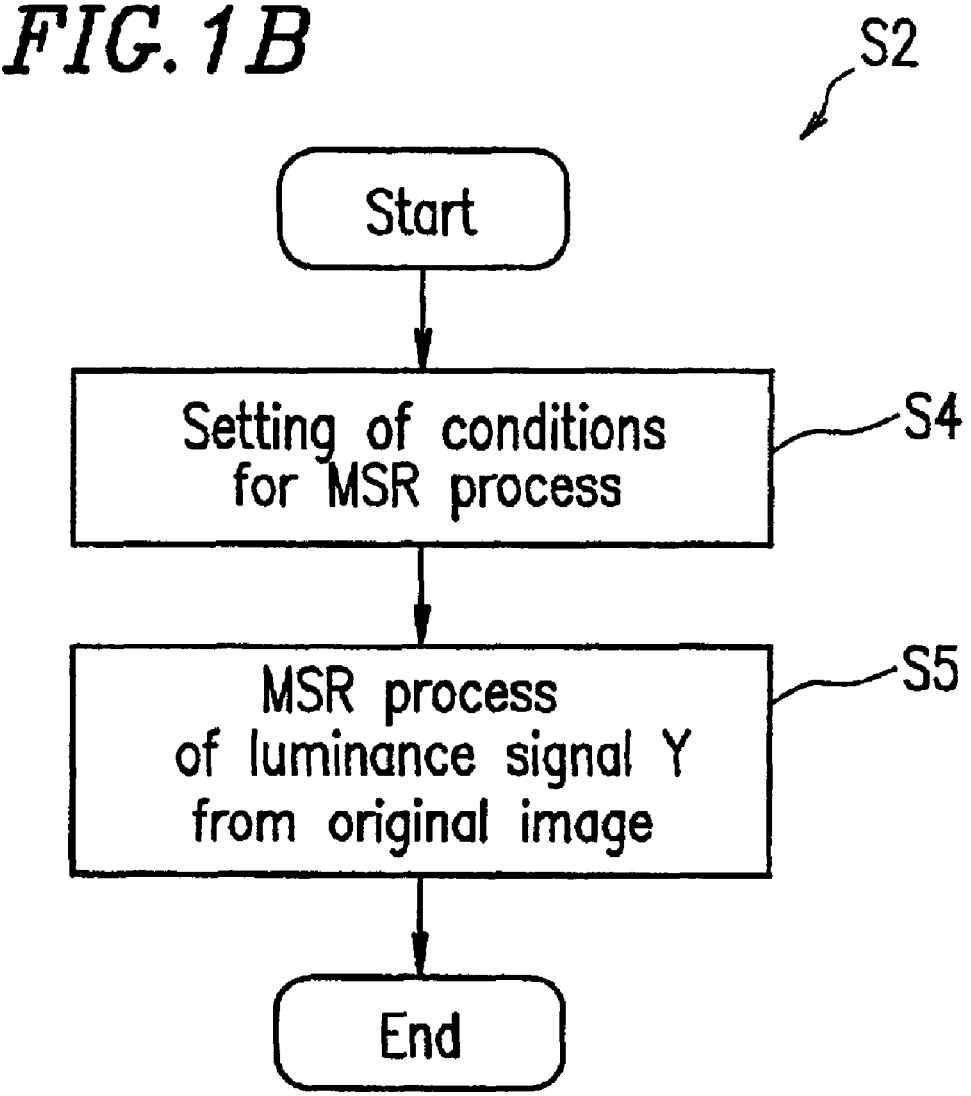

IMAGE PROCESSING METHOD AND IMAGE PROCESSING APPARATUS

BACKGROUND OF THE INVENTION

1. Field of the Invention

The present invention relates to an image processing method for providing a desired, optimum dynamic range to a digital color still picture that has been captured by a digital camera, a monitoring camera, etc.

2. Description of the Related Art

As a method for correcting brightness information, color information, etc., of a digital color still image, a retinex method taking a retina of an eye-ball as a model is proposed, in which a brightness value of an image with a biased dynamic range (dynamic characteristic) is corrected based on local information of the image. In such a retinex method, the visibility of an image can be improved by correcting a low brightness value resulting in a darker portion in the image to a high brightness value, and a high brightness value resulting in a brighter portion in the image to a low brightness value.

As examples of such a retinex method, the single scale retinex method (Daniel J. Jobson, et al., "Properties and Performance of a Center/Surround Retinex," IEEE Trans. on Image Processing vol. 6, pp. 451–462, March 1997) and the color restoration multiscale retinex method (Daniel J. Jobson, et al., "A Multiscale Retinex for Bridging the Gap Between Color Image and the Human Observation of Scenes," IEEE Trans. on Image Processing vol. 6, pp. 956–976, July 1997) are proposed.

In the single scale retinex method, a spectrum component $I_i(x,y)$ (i=1, 2, . . . ) of a target pixel $I(x,y)$ in an original image is corrected by a surround function $F(x,y)$ obtained from image information of the surround pixels. The result $R_i$ of retinex processing is shown by expression (1):

$$R_i = log(I_i(x,y)) - log[F(x,y)*I_i(x,y)] \quad (1)$$

where "*" denotes a convolution operation.

In this case, the surround function $F(x,y)$ is a function which is based on the image information of the surround pixels with respect to the target pixel $I(x,y)$, which is represented by expression (2):

$$F(x, y) = Ke^{-r^2/c^2} \quad (2)$$

where r denotes a distance ($r^2=x^2+y^2$) between the target pixel and the surround pixel, and c is a scaling variable. Furthermore, K is a scalar coefficient, which is set so that $\iint F(x,y)dxdy=1$ is satisfied, i.e., the total value of the surround function is 1.

As described above, in the single scale retinex method, the spectrum band components of the target pixel are retinex-processed based on the surround function. On the other hand, in the color restoration multiscale retinex (MSR) method, each of the spectrum band components, $I_i$, of the target pixel is retinex-processed by N types of scales. In this case, the result of the single retinex process for each of the N scales is multiplied by a weighting factor $\omega_n$, and the multiplication results with respect to all the scales are totaled. The result of the multiscale retinex (MSR) processing, $R_{MSRi}$, is represented by expression (3):

$$R_{MSR_i} = \sum_{n=1}^{N} \omega_n R_{ni} \quad (3)$$

As described above, in the MSR processing, the retinex processing is carried out for each spectrum band component of an image. Therefore, the ratio of the spectrum band components in the image is changed, causing a color shift. According to a conventional technique, such a color shift is corrected by a color restoration function. In this case, at first, a color space of an original image is converted into a relative color space by expression (4):

$$I_i'(x, y) = I_i(x, y) \Big/ \sum_{i=1}^{S} I_i(x, y) \quad (4)$$

In expression (4), $I'_i(x,y)$ denotes a color component of the original image, and S denotes the number of dimensions of the color space. When the three primary colors (R, G, B) are used, S=3. With such a color component, $I'_i(x,y)$, the color correction coefficient $C_i(x,y)$ is obtained by expression (5):

$$C_i(x,y)=f[I'_i(x,y)] \quad (5)$$

This color correction coefficient $C_i(x,y)$ can be rewritten as in expression (6):

$$C_i(x, y) = \beta log[\alpha I_i'(x, y)] \quad (6)$$
$$= \beta \left\{ log[\alpha I_i(x, y)] - log\left[\sum_{i=1}^{S} I_i(x, y)\right] \right\}$$

where $\alpha$ and $\beta$ are constants.

The result of the MSR processing, $R_{MSRi}$, obtained by expression (3) is corrected by the color correction coefficient $C_i(x,y)$ of expression (6), thereby obtaining the result of the color correction multiscale retinex processing, $R_{MSRCRi}(x,y)$, as shown in expression (7):

$$R_{MSRCR_i}(x,y)=C_i(x,y)R_{MSR_i}(x,y) \quad (7)$$

The result of the color correction multiscale retinex processing, $R_{MSRCRi}(x,y)$, can be rewritten as in expression (8):

$$R_{MSRCR_i}(x, y) = \quad (8)$$
$$G\left[C_i(x, y)\sum_{n=1}^{N} \omega_n \{log I_i(x, y) - log[I_i(x, y)*F_n(x, y)]\} + b\right]$$

where G and b are constants.

As described above, the result of the retinex processing that is carried out for each of the spectrum band components of the original image is corrected based on the color correction coefficient, thereby preventing the color shift caused by the change in the ratio of spectrum band components.

Such a color correction multiscale retinex method is applied to a medical photograph, an aerial photograph, or the like. With this method, images, patterns, or the like, which cannot be perceived by a human eye, are corrected so as to be perceived by the human eye. However, such a correction does not faithfully reproduce an object as an image. Thus, the color correction multiscale retinex method is not necessarily a suitable processing method for a monitoring camera, a digital still camera, or the like.

Furthermore, the multiscale retinex method requires a product-sum operation which is necessary for a log operation, an exponentiation operation, and a convolution operation. Therefore, as the number of surround pixels to be referred to increases, the calculation amount also increases. Moreover, a memory with a large capacity is required for storing the information of the two-dimensional surround pixels, the result of intermediate processes, etc. Accordingly, when a device using the retinex method is realized, the economical efficiency thereof might be deteriorated. In addition, since the number of accesses to a memory that stores operation values increases, there occurs a possibility that the processing time might increase.

Especially in recent years, digital cameras with high resolutions in which the number of subjective pixels is one or two megapixels have been developed. In such a digital camera, the time required for the MSR processing further increases.

SUMMARY OF THE INVENTION

According to one aspect of the present invention, an image processing method includes the steps of: separating a luminance signal from a color signal of an original image, and multiscale retinex processing only the luminance signal; and producing an image based on the multiscale retinex processed luminance signal and the color signal of the original image.

In one embodiment of the present invention, the image processing method further includes a step of normalizing the multiscale retinex processed luminance signal based on a gain and an offset.

In another embodiment of the present invention, a one-dimensional function having a symmetric property is used as a surround function for the multiscale retinex processing.

In still another embodiment of the present invention, a part of the one-dimensional function in a range such that the one-dimensional function has a symmetric property is converted into a table.

In still another embodiment of the present invention, the image processing method further includes a step of performing a one-dimensional convolution operation in the multiscale retinex processing.

According to another aspect of the present invention, an image processing apparatus includes: a multiscale retinex processing section for separating a luminance signal from a color signal of an original image, and for multiscale retinex processing only the luminance signal; a first memory for storing a plurality of predetermined constants for use in the multiscale retinex processing; and a second memory for storing a size of the original image and the luminance signal of the original image, wherein an image is produced based on the multiscale retinex processed luminance signal and the color signal of the original image.

In one embodiment of the present invention, the plurality of predetermined constants include the number of multiscales, a scaling variable, and a weighting factor.

In another embodiment of the present invention, the multiscale retinex processed luminance signal is normalized based on a gain and an offset.

In still another embodiment of the present invention, the image processing apparatus further includes a third memory for storing the normalized, multiscale retinex processed luminance signal.

In still another embodiment of the present invention, a one-dimensional function having a symmetric property is used as a surround function for the multiscale retinex processing.

In still another embodiment of the present invention, part of the one-dimensional function in a range such that the one-dimensional function has a symmetric property is converted into a table.

In still another embodiment of the present invention, a one-dimensional convolution operation is performed in the multiscale retinex processing.

Thus, the invention described herein makes possible the advantages of (1) providing an image processing method by which the occurrence of the color shift is prevented, and an image is provided with a superior dynamic range, and (2) providing another image processing method by which the calculation amount in the multiscale retinex method can be reduced, whereby the time required for processing is significantly reduced, and by which the memory capacity for storing calculation values can be reduced, thereby realizing an apparatus using such an image processing method at a low cost.

These and other advantages of the present invention will become apparent to those skilled in the art upon reading and understanding the following detailed description with reference to the accompanying figures.

BRIEF DESCRIPTION OF THE DRAWINGS

FIG. 1A is a flowchart illustrating an example of an image processing method according to the present invention.

FIG. 1B is a flowchart illustrating the multiscale retinex (MSR) processing and the setting of conditions for the MSR processing according to an embodiment of the present invention.

DESCRIPTION OF THE PREFERRED EMBODIMENTS

Figure 2:
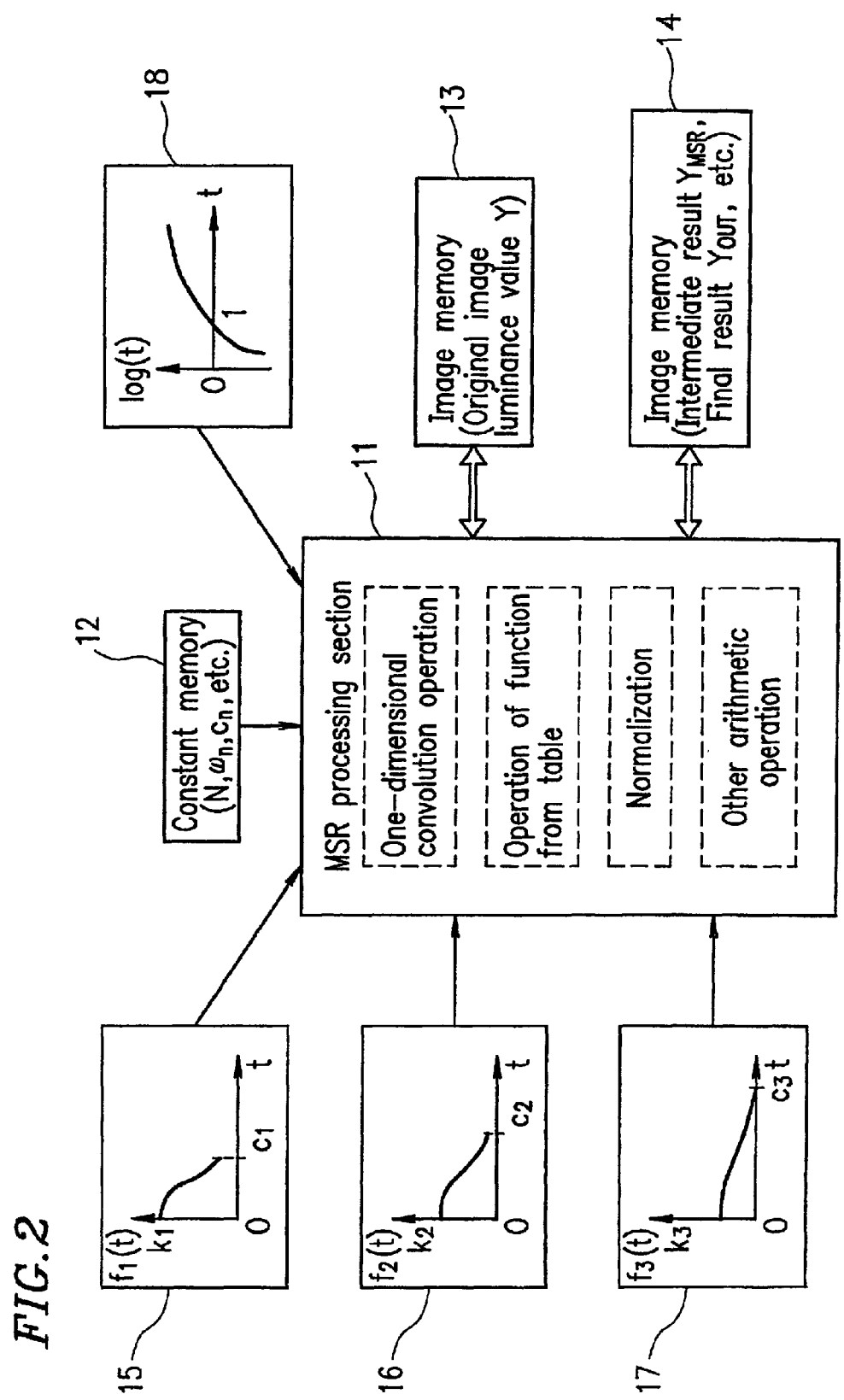
FIG. 2 shows a schematic structure of an apparatus used for carrying out the image processing method according to an embodiment of present invention.

Hereinafter, an embodiment of the present invention will be described with reference to the drawings.

FIG. 1A is a flow chart showing an outline of an image processing method of the present invention. For the purpose of preventing a color shift in an original image, a luminance signal Y is separated from color signals Cr and Cb, or color-difference signals I and Q. (See step S1 of FIG. 1A.) The separated luminance signal Y is subjected to a multiscale retinex (MSR) processing (step S2). Then, a multiscale retinex processed luminance signal $Y_{MSR}$ is normalized by expression (9). In expression (9), u denotes a gain of the normalization, and v denotes an offset of the normalization, which are determined by the number of bits representing a luminance signal, the precision of operations, etc.

$$Y_{out} = uY_{MSR} + v \quad (9)$$

After the multiscale retinex processed luminance signal $Y_{MSR}$ has been normalized, an image is produced based on the result of the normalization, $Y_{OUT}$, and the color signals Cr and Cb or the color-difference signals I and Q in the original image, and the produced image is output (Step S3).

The RGB components of a primary color signal of the original image has a relationship between the luminance signal Y and the color signals Cr and Cb as shown in expression (10):

$$\begin{pmatrix} Y \\ Cr \\ Cb \end{pmatrix} = \begin{pmatrix} 0.30 & 0.59 & 0.11 \\ 0.70 & -0.59 & -0.11 \\ -0.30 & -0.59 & 0.89 \end{pmatrix} \begin{pmatrix} R \\ G \\ B \end{pmatrix} \quad (10)$$

Furthermore, the RGB components of a primary color signal in the original image has another relationship between the luminance signal Y and the color-difference signals I and Q, as shown in expression (11):

$$\begin{pmatrix} Y \\ I \\ Q \end{pmatrix} = \begin{pmatrix} 0.30 & 0.59 & 0.11 \\ 0.60 & -0.28 & -0.32 \\ 0.21 & -0.52 & 0.31 \end{pmatrix} \begin{pmatrix} R \\ G \\ B \end{pmatrix} \quad (11)$$

In a digital camera or the like, the luminance signal Y and the color signals Cr and Cb as represented by expression (10), or the luminance signal Y and the color-difference signals I and Q as represented by expression (11) can be obtained. In the image processing method according to the present invention, only the luminance signal Y is extracted from a signal set including the luminance signal Y and the color signals Cr and Cb or a signal set including the luminance signal Y and the color-difference signals I and Q, and the extracted luminance signal Y is subjected to the multiscale retinex (MSR) processing with respect to each of the N scales as shown in expressions (12) and (13):

$$Y_n = \log Y(x,y) - \log[F_n(x,y)*Y(x,y)] \quad (12)$$

$$Y_{MSR} = \sum_{n=1}^{N} \omega_n Y_n; \quad (13)$$

In expression (13), a weighting factor $\omega_n$ is represented by expression (14):

$$\sum_{n=1}^{N} \omega_n = 1 \quad (14)$$

After the multiscale retinex processed luminance signal $Y_{MSR}$ has been obtained, an image is produced based on the luminance signal $Y_{MSR}$ and the color signals Cr and Cb or the color-difference signals I and Q of the original image.

The brightness of the resultant image has been corrected by the multiscale retinex method so that the image has the desirable dynamic range. In addition, the possibility of a color shift of the resultant image is eliminated.

In carrying out such an image processing, for the purpose of reducing the calculation amount, a two-dimensional surround function as represented by expression (2) is used as a one-dimensional function as shown in expression (15):

$$f_n(t) = k_n e^{-t^2/c_0^2} \quad (15)$$

In this case, the scalar coefficient K is set such that one-dimensional function as represented by expression (16) is satisfied:

$$\int f_n(t)dt = 1 \quad (16)$$

The function $f_n(t)$ as represented by expression (15) is an even function, and has a symmetric property such that a value of the function $f_n(t)$ in the range $t \in [-c,0]$ (c is scaling variable), and a value of the function $f_n(t)$ in the range, $t \in [0,c]$, are equal to each other. Therefore, only values of the function $f_n(t)$ in the range, $t \in [0,c]$, are converted into a stored value table, whereby a value of the function $f_n(t)$ can be obtained over the entire range of $t \in [-c,c]$.

Furthermore, in place of a two-dimensional convolution operation of expression (12) for the retinex processing of the luminance signal Y, a one-dimensional convolution operation is performed twice, as shown in expressions (17) and (18), whereby the calculation amount is reduced.

$$Y_n = \log Y(x,y) - \log\{f_n(y)*[f_n(x)*Y(x,y)]\} \quad (17)$$

$$Y_n = \log Y(x,y) - \log\{f_n(x)*[f_n(y)*Y(x,y)]\} \quad (18)$$

In expression (17), a convolution operation in the y-axis direction is performed after a convolution operation in the x-axis direction. While, in expression (18), a convolution operation in the x-axis direction is performed after a convolution operation in the y-axis direction.

Furthermore, the two log operations in each of the expressions (17) and (18) can be performed by a single log operation as shown in expressions (19) or (20), respectively:

$$Y_n = \log(Y(x,y)/(f_n(y)*[f_n(x)*Y(x,y)])) \quad (19)$$

$$Y_n = \log(Y(x,y)/(f_n(x)*[f_n(y)*Y(x,y)])) \quad (20)$$

whereby the calculation amount can be decreased.

FIG. 2 shows a schematic structure illustrating an example of an image processing apparatus that is used for carrying out the above-described image processing method. This image processing apparatus includes: an MSR processing section 11 for receiving and MSR processing an original image; a constant memory 12 for storing various constants used in the MSR processing; an image memory 13 for storing the size of an original image, a luminance value Y, etc.; and an image memory 14 for storing an MSR processed luminance value $Y_{MSR}$, a normalized luminance value $Y_{OUT}$, etc. The image processing apparatus further includes a memory for storing surround function tables 15, 16, and 17 into which surround functions corresponding to the number of scales, N, are converted into a table, and a memory for storing a logarithmic table 18 for log operations.

In such an image processing apparatus, the luminance signal Y is subjected to the MSR processing, as described in step S2 of FIG. 1A. The details of the MSR processing of step S2 are described in FIG. 1B. In the beginning of the MSR processing shown in FIG. 1B, conditions for the MSR processing are set (step S4). After the conditions for the MSR processing have been set, the MSR processing of the luminance signal Y from an original image is performed (step S5).

Figure 3:
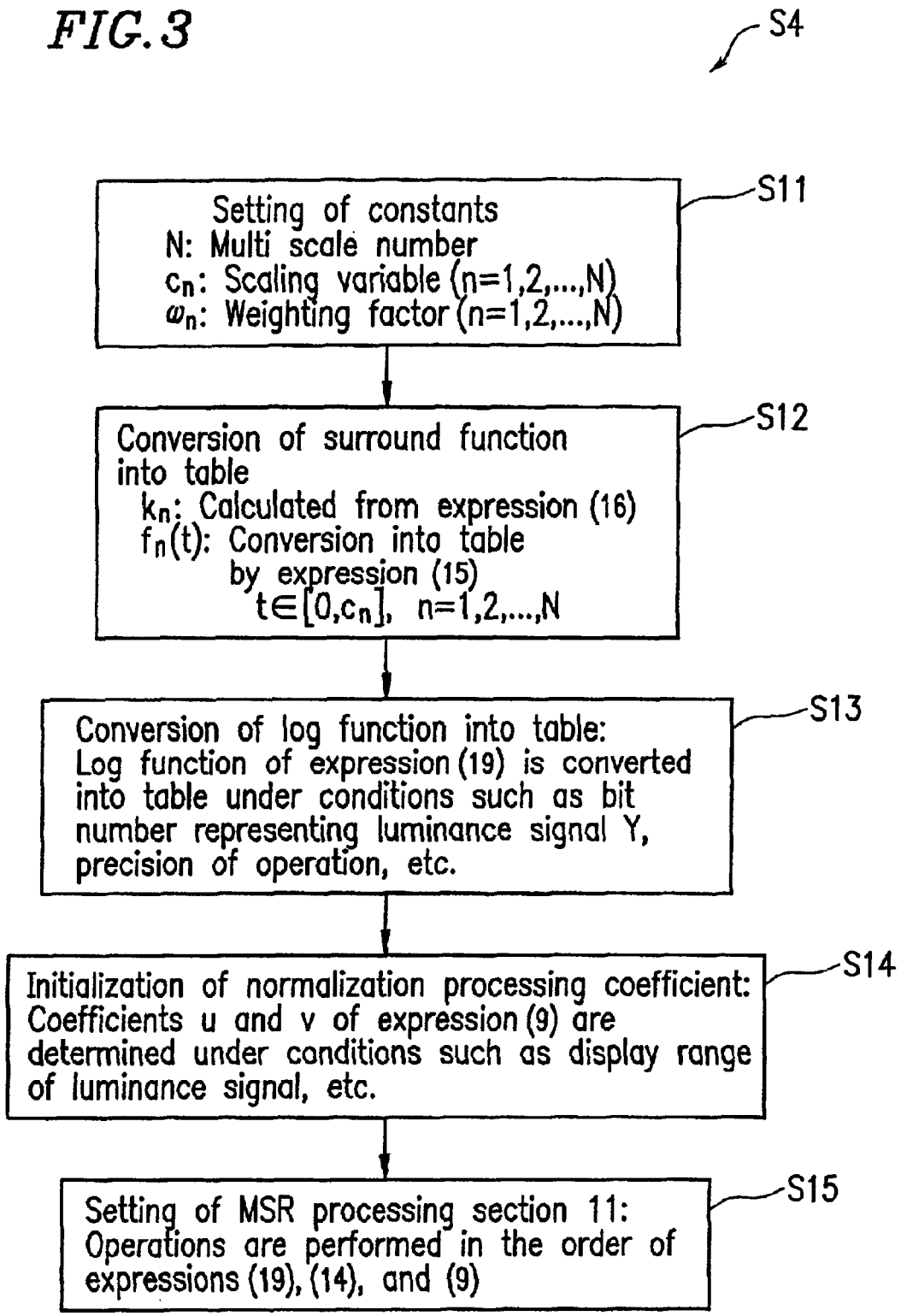
FIG. 3 is a flowchart illustrating a process of a method for setting the conditions for the MSR process in the image processing method according to an embodiment of the present invention.

The process of setting the conditions for the MSR processing in step S4 shown in FIG. 1B is described in the flowchart of FIG. 3. In this case, as a first step in the constant memory 12 the number of multiscales N, a scaling variable $c_n$, the weighting factor $\omega_n$, etc., are set. (See step S11 of FIG. 3.) Specifically, for example, when the three scales of small, medium, and large are set in the constant memory 12, the number of multiscales N is set to 3 in the constant memory 12, and the weighting factor $\omega_n$ is set to $\frac{1}{3}$ in the constant memory 12. Furthermore, in the constant memory 12, the scaling variable $c_1$ for the small scale, the scaling variable $c_2$ for the medium scale, and the scaling variable $c_3$ for the large scale are set such that $c_1=5$, $c_2=160$, and $c_3=400$. On the other hand, images are stored in the image memory 13 in a quantized state such as the original image size of 1200×960 and the luminance value Y of 8 bits (0–255), for example.

Next, each of the surround functions with respective scale sizes is converted into a table (step S12). In this case, with respect to each scale, the coefficient $k_n$ is set so as to satisfy expression (16), and the function $f_n(t)$ calculated by expression (15) is converted into a stored value table in the range of $t \in [0, c_n]$.

When three scales of small, medium, and large are set in the constant memory 12, surround function tables 15, 16, and 17 of small scale, medium scale, and large scale, respectively, are stored in the constant memory 12.

Thereafter, a log function of expression (19) is converted into a table based on the bit number representing the luminance signal Y of an original image, the precision of operation, etc. (step S13), and the table is stored in the constant memory 12. Then, the gain u and the offset v, which are coefficients used when the MSR processed luminance value is normalized based on expression (9), are set based on the conditions such as the display range of the luminance signal Y of an original image (step S14). The gain u and the offset v are stored in the constant memory 12.

In the last step (step S15), as an operation condition in the MSR processing section 11, a condition is established such that operations are performed in the order of expressions (19), (14), and (9).

Figure 4:
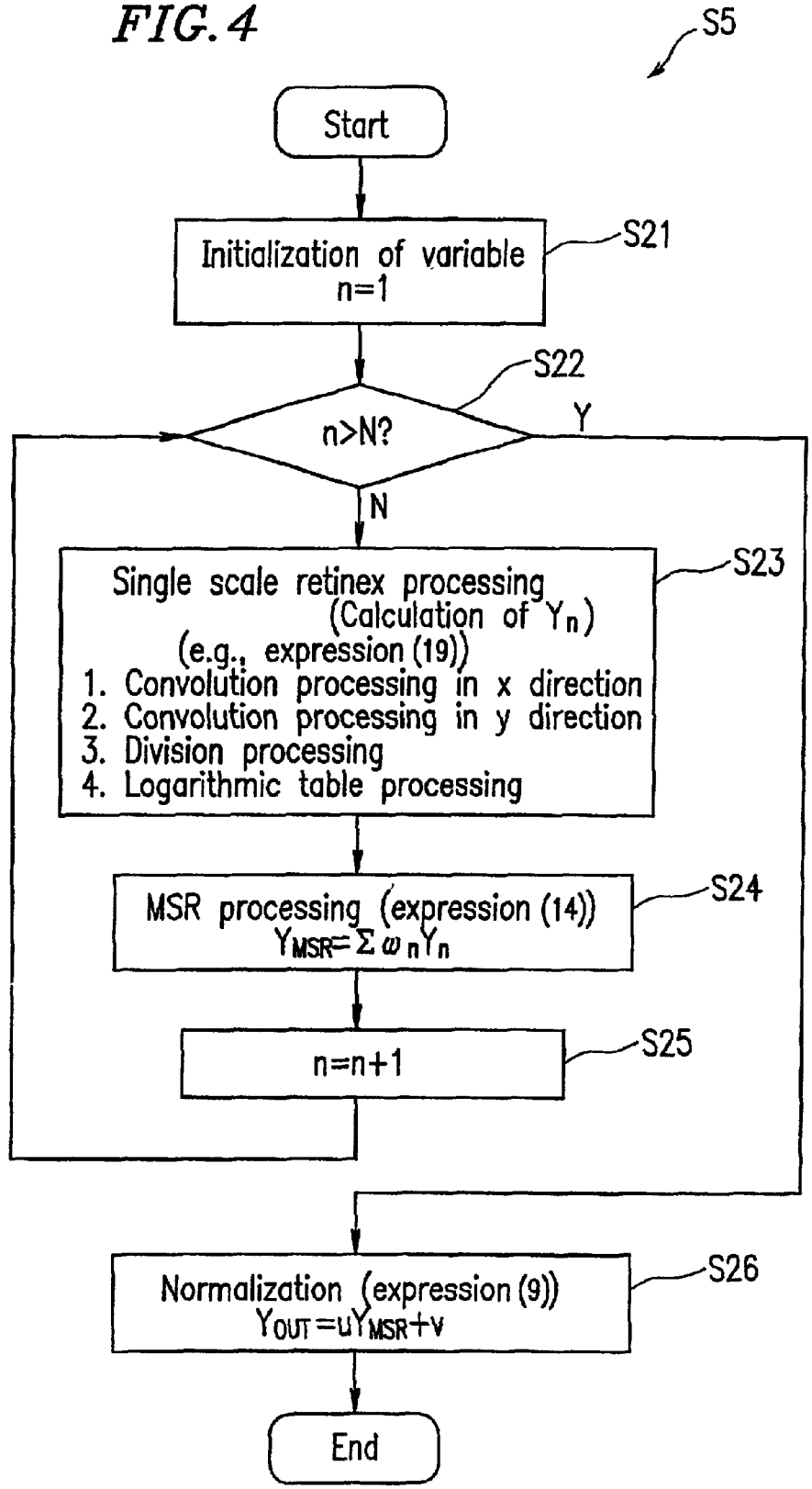
FIG. 4 is a flowchart illustrating a process of the MSR processing in the image processing method according to an embodiment of the present invention.

After such a condition has been established, the MSR processing section 11 MSR processes the luminance signal Y from the original image (step S5 of FIG. 1B). The details of the MSR processing of step S5 of FIG. 1B are described in the flowchart of FIG. 4. In this case, as a first step, the variable n (n=1, 2, . . . , N) specifying any of the N scales is initialized so that n=1 (see step S21 of FIG. 4). Then, it is confirmed whether or not the variable n (=1) is greater than the set number of scales N (step S22). When the variable n is smaller than or equal to the number of scales N (n≦N), the luminance signal Y in the original image is single scale retinex processed based on expression (19), thereby obtaining the result of the single scale retinex process, Yn for the luminance signal Y (step S23).

In this process, as a first step, a convolution operation in the x-axis direction is carried out, and the other convolution operation in the y-axis direction is then carried out. Thereafter, each of the results of the convolution operations is subjected to a division processing, and the result of the division processing is subjected to a logarithmic operation processing based on the log function table stored in the memory.

After the luminance signal Y has undergone the single scale retinex processing as described above, the result of the retinex processing, Yn, is subjected to the multiscale retinex (MSR) processing based on expression (14) (step S24). Thereafter, the variable n, specifying a scale, is updated (step S25), and the luminance signal Y is subjected to the single retinex processing and the MSR processing with respect to the nth scale.

In such a manner, the luminance signal Y is subjected to the MSR processing with respect to the predetermined number of scales N, whereby the result of the MSR processing, $Y_{MSR}$, is normalized based on expression (9) (step S26).

After the multiscale retinex processed luminance signal $Y_{MSR}$ is normalized as described above, an image is produced based on the result of the normalization, $Y_{OUT}$, and the color signals Cr and Cb or the color-difference signals I and Q of the original image, from which the luminance signal Y has been separated. No color shift occurs in the produced image, and the luminance thereof has been corrected.

In an image processing method of the present invention, a luminance signal is separated from a color signal and subjected to MSR processing. Therefore, there is no possibility for a color shift. In addition, the calculation amount of the MSR processing is significantly decreased, whereby the processing time is considerably shortened. Furthermore, the reduction in the amount of information to be stored in a memory reduces the number of memory accesses, which also reduces the processing time. The reduction of the memory capacity realizes an economical apparatus using a memory with a small capacity.

Various other modifications will be apparent to and can be readily made by those skilled in the art without departing from the scope and spirit of the invention. Accordingly, it is not intended that the scope of the claims appended hereto be limited to the description as set forth herein, but rather that the claims be broadly construed.

What is claimed is:

1. An image processing method comprising:
   separating a luminance signal from a color signal of an original image, and multiscale retinex processing only the luminance signal; and
   producing an image based on the multiscale retinex processed luminance signal and the color signal of the original image.

2. An image processing method according to claim 1, further comprising normalizing the multiscale retinex processed luminance signal based on a gain and an offset.

3. An image processing method according to claim 1, wherein a one-dimensional function having a symmetric property is used as a surround function for the multiscale retinex processing.

4. An image processing method according to claim 3, wherein a part of the one-dimensional function in a range, such that the one-dimensional function has a symmetric property, is converted into a table.

5. An image processing method according to claim 1, further comprising performing a one-dimensional convolution operation in the multiscale retinex processing.

6. An image processing apparatus, comprising:
   a multiscale retinex processing section for separating a luminance signal from a color signal of an original image, and for multiscale retinex processing only the luminance signal;
   a first memory for storing a plurality of predetermined constants for use in the multiscale retinex processing; and
   a second memory for storing a size of the original image and the luminance signal of the original image,
   wherein an image is produced based on the multiscale retinex processed luminance signal and the color signal of the original image.

7. An image processing apparatus according to claim 6, wherein the plurality of predetermined constants comprise a number of multiscales, a scaling variable, and a weighting factor.

8. An image processing apparatus according to claim 6, wherein the multiscale retinex processed luminance signal is normalized based on a gain and an offset.

9. An image processing apparatus according to claim 8, further comprising a third memory for storing the normalized, multiscale retinex processed luminance signal.

10. An image processing apparatus according to claim 6, wherein a one-dimensional function having a symmetric property is used as a surround function for the multiscale retinex processing.

11. An image processing apparatus according to claim 10, wherein part of the one-dimensional function in a range, such that the one-dimensional function has a symmetric property, is converted into a table.

12. An image processing apparatus according to claim 6, wherein a one-dimensional convolution operation is performed in the multiscale retinex processing.

* * * * *